(12) United States Patent
Kwon et al.

(10) Patent No.: US 6,768,528 B1
(45) Date of Patent: Jul. 27, 2004

(54) LIQUID CRYSTAL DISPLAY HAVING HIGH BRIGHTNESS AND ENHANCED VIEWING ANGLE

(75) Inventors: Young-Wan Kwon, Seoul (KR); Jong-Weon Moon, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 88 days.

(21) Appl. No.: 09/704,745

(22) Filed: Nov. 3, 2000

(30) Foreign Application Priority Data

Nov. 5, 1999 (KR) .......................................... 1999-48743

(51) Int. Cl.[7] .......................................... G02F 1/1335
(52) U.S. Cl. .................................................... 349/112
(58) Field of Search ................................ 349/112, 106, 349/96, 95, 117, 98, 65, 115, 100

(56) References Cited

U.S. PATENT DOCUMENTS

| | | | |
|---|---|---|---|
| 5,418,631 A | * 5/1995 | Tedesco | ......................... 359/15 |
| 5,629,784 A | * 5/1997 | Abileah et al. | .............. 349/112 |
| 5,822,029 A | * 10/1998 | Davis et al. | ................. 349/115 |
| 5,841,494 A | * 11/1998 | Hall | ............................ 349/98 |
| 5,963,284 A | * 10/1999 | Jones et al. | .................. 349/112 |
| 6,144,430 A | * 11/2000 | Kuo | ........................... 349/113 |
| 6,198,520 B1 | * 3/2001 | Kondo et al. | ................ 349/141 |
| 6,295,108 B1 | * 9/2001 | Kaneko | ....................... 349/115 |

* cited by examiner

Primary Examiner—Tarifur R. Chowdhury
Assistant Examiner—Thoi V. Duong
(74) Attorney, Agent, or Firm—Birch, Stewart, Kolasch & Birch, LLP

(57) ABSTRACT

A liquid crystal display (LCD) realizes a high brightness by using cholesteric liquid crystal (CLC) in a color filter and a polarizer, and improves viewing angles by using a hologram diffuser. The LCD includes a back light unit to produce and supply light, and a collimating sheet to collimate the light supplied by the back light unit. A CLC polarizer transmits left-circularly polarized light from the collimating sheet, and reflects other light. A lower substrate is disposed above the CLC polarizer, and an upper substrate is disposed above the lower substrate and includes a holographic diffuser which diffuses light without altering a polarization of the light. A liquid crystal layer is disposed between the lower substrate and the upper substrate, and a color filter layer which transmits only predetermined wavelengths of light is also disposed between the lower substrate and the upper substrate. An upper linear polarizer is located above the upper substrate. Accordingly, the LCD provides enhanced viewing angles via the holographic diffuser. Also, the LCD realizes high brightness via the CLC diffuser and a CLC color filter layer.

4 Claims, 3 Drawing Sheets

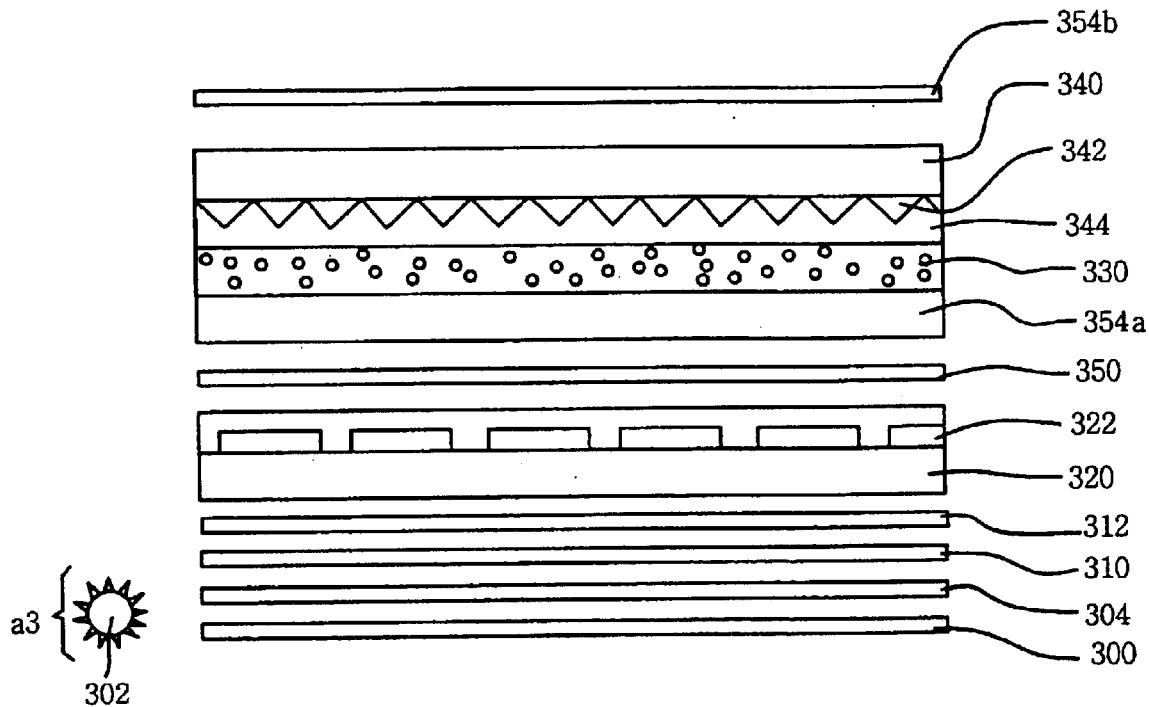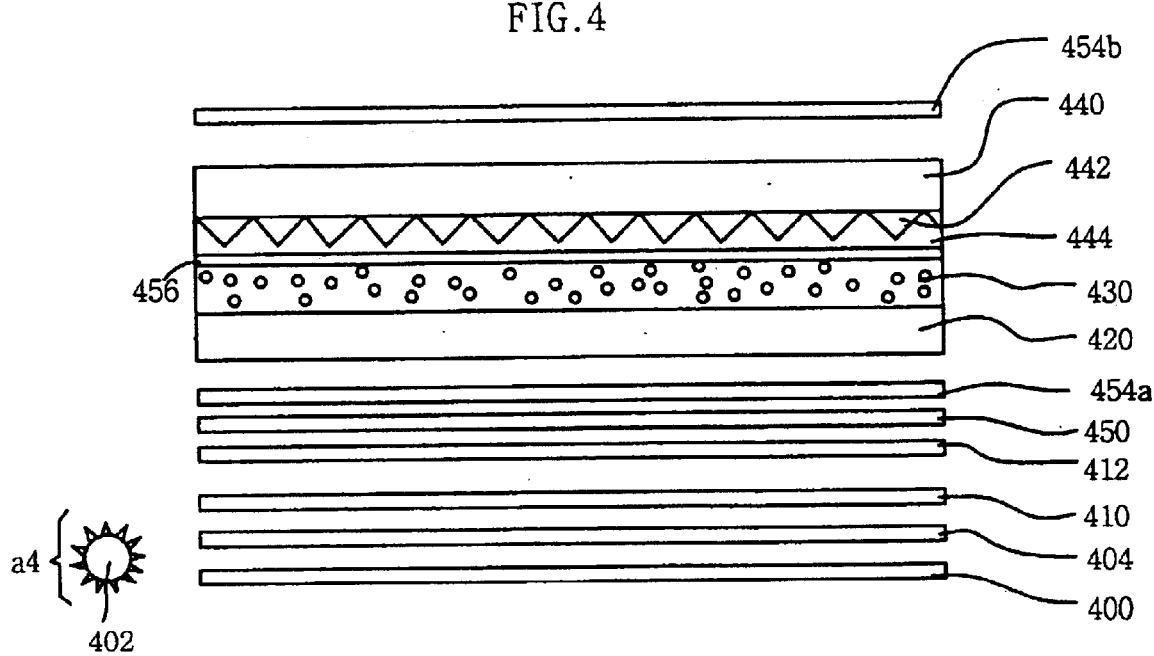

LIQUID CRYSTAL DISPLAY HAVING HIGH BRIGHTNESS AND ENHANCED VIEWING ANGLE

BACKGROUND OF THE INVENTION

1. Field Of Invention

The present invention relates to a liquid crystal display (hereinafter abbreviated LCD) which realizes a high brightness and improves viewing angles.

2. Discussion Of Related Art

Lately, LCDs have been widely used as planarized plate displays. As techniques for fabricating thin film transistors using amorphous silicon are developed, the image quality of these LCDs is greatly improved. Thus, LCDs are widely used in notebook computers, personal computer monitors, and the like.

FIG. 1 shows a cross-sectional view of an LCD according to a related art. Referring to FIG. 1, the LCD includes a back light unit a1 for generating and uniformly supplying light, and a lower polarizing plate 110 for transforming a polarization characteristic of the supplied light from the back light unit al to a given direction. The LCD also includes a lower substrate 120 on which thin film transistors (not shown) are formed to control the transmissive rate of the light polarized by the lower polarizing plate 110. A liquid crystal layer 130 changes a polarization direction of the light whose transmissive rate has been controlled by the lower substrate 120. An upper substrate 140, on which a color filter layer 142 is disposed, causes the polarized light to have a specific color wavelength matching a corresponding color filter. An upper polarizing plate 150 changes the polarization characteristic of the light having passed through the upper substrate 140.

The back light unit al is constructed with a light source 102 for generating light, and a light-guiding plate 104 for guiding the light generated from the light source 102 to a liquid crystal panel uniformly. A reflection plate 100 under the light-guiding panel 104 reflects incident light from the bottom or side of the light-guiding plate 104 toward the liquid crystal panel.

In the above-constructed related art LCD, the light generated from the light source 102 passes through the light-guiding plate 104, and is uniformly polarized after passing through the lower polarizing plate 110.

A polarizing direction of the light having been polarized through the lower polarizing plate 110 is changed at the thin film transistor (not shown) on the lower substrate 120 and the liquid crystal layer 130. Namely, the polarization direction of the polarized light is selectively revolved according to a state of the transistor when passing through the liquid crystal layer 130. Then, the changed light passes through the color filter layer 142 of the upper substrate 140, which only transmits wavelengths of the specific colors corresponding to the respective color filters.

An image is realized when the light having a specific color transmitted by the color filter layer 142 proceeds to the upper polarizing plate 150. The upper polarizing plate 150 only transmits the light whose polarized direction has been revolved by the liquid crystal. In this case, the polarizing characteristic of the upper polarizing plate 150 is perpendicular to that of the lower polarizing plate 110.

Thus, the basic principle of the LCD is that the polarized direction of the light is revolved after the polarized light from the lower polarizing plate 110 passes through the liquid crystal layer 130. The length that the light travels in the liquid crystal is important. When the liquid crystal is placed between the upper and lower polarizing plates 150 and 110, the thickness of the liquid crystal changes the polarized direction of the light according to the following formula.

$$(\Delta n)Z = \lambda/4 \qquad (I)$$

wherein $\Delta n$ is a difference of a refractive index between a perpendicular direction and a parallel direction of the proceeding direction of the light in double refraction, $Z$ is a thickness of the liquid crystal, and $\lambda$ is a wavelength of the light.

In this case, once the proceeding direction of the light is perpendicular to the liquid crystal layer, the proceeding length of the light becomes z to show the same result of the formula (I). Thus, the cut-off of the light by the vertical polarizing plate becomes very effective.

However, when the light proceeds at a slant (i.e., an acute angle to perpendicular), the proceeding (or path) length of the light becomes longer. Thus, the upper polarizing plate is unable to cut off the light precisely due to the change of the polarized direction of the light. Hence, the optimal way to achieve cut-off of polarized light is to improve the straightness (with respect to perpendicular) of the light passing though the liquid crystal.

Unfortunately, the LCD according to the related art limits the viewing angles of the LCD once the straightness of the light is elevated.

SUMMARY OF THE INVENTION

Accordingly, the present invention is directed to a liquid crystal display that substantially obviates one or more of the problems due to limitations and disadvantages of the related art.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect the present invention includes a back light unit to produce and supply light; a collimating sheet to collimate the light supplied by the back light unit; a cholesteric liquid crystal (CLC) polarizer to transmit one of left-circularly polarized light and right-circularly polarized light from the collimating sheet, and to reflect other light not transmitted; a lower substrate on which a CLC color filter layer is formed wherein the CLC color filter layer transmits the circularly polarized light from the CLC polarizer having specific red, green, and blue wavelengths and reflects other light not transmitted; a liquid crystal layer to selectively revolve a polarized direction of the circularly polarized light from the CLC color filter layer; an upper substrate over the liquid crystal layer having a hologram diffuser and a planarization layer disposed thereon and wherein the hologram diffuser diffuses the changed circularly polarized light from the liquid crystal layer; and a linear polarizing transformer to transform the diffused circularly polarized light from the hologram diffuser into linearly polarized light.

In another aspect, the present invention includes a back light unit to produce and supply light; a collimating sheet to collimate the light supplied by the back light unit; a cholesteric liquid crystal (CLC) polarizer to transmit one of left-circularly polarized light and right-circularly polarized light from the collimating sheet, and to reflect other light not transmitted; a lower substrate on which a CLC color filter layer is formed wherein the CLC color filter layer transmits the circularly polarized light from the CLC polarizer having specific red, green, and blue wavelengths and reflects other light not transmitted; a λ/4 film to transform the circularly polarized light from the CLC color filter layer into linearly-polarized light; a first linear polarizer above the λ/4 film; a liquid crystal layer to selectively transmit the linearly-polarized light; and an upper substrate over the liquid crystal layer having a hologram diffuser and a planarization layer disposed thereon and wherein the hologram diffuser diffuses the linearly-polarized light from the liquid crystal layer.

In still another aspect, the present invention includes a back light unit to produce and supply light; a collimating sheet to collimate the light supplied by the back light unit; a cholesteric liquid crystal (CLC) polarizer to transmit one of left-circularly polarized light and right-circularly polarized light from the collimating sheet, and to reflect other light not transmitted; a λ/4 film to transform the circularly polarized light from the CLC polarizer into linearly-polarized light; a linear polarizer above the λ/4 film; a lower substrate above the linear polarizer; a liquid crystal layer above the lower substrate; and an upper substrate over the liquid crystal layer having a hologram diffuser, a planarization layer, and an absorbing type color filter layer disposed thereon and wherein the hologram diffuser diffuses the linearly-polarized light from the liquid crystal layer.

In a further aspect, the present invention includes a back light unit to produce and supply light; a collimating sheet to collimate the light supplied by the back light unit; a cholesteric liquid crystal (CLC) polarizer to transmit one of left-circularly polarized light and right-circularly polarized light from the collimating sheet, and to reflect other light not transmitted; a lower substrate on which a CLC color filter layer is disposed wherein the CLC polarizer transmits light from the CLC polarizer having specific red, green, and blue wavelengths and reflects other light not transmitted; a liquid crystal layer; and an upper substrate over the liquid crystal layer having a hologram diffuser, a planarization layer, and a linear polarizer disposed thereon and wherein the hologram diffuser diffuses light from the liquid crystal layer.

In yet a further aspect, the present invention includes a back light unit to produce and supply light; a collimating sheet to collimate the light supplied by the back light unit; a cholesteric liquid crystal (CLC) polarizer to transmit circularly polarized light of a predetermined direction from the collimating sheet, and to reflect other light not circularly polarized in the predetermined direction; a lower substrate above the CLC polarizer; an upper substrate above the lower substrate including a holographic diffuser disposed thereon and wherein the hologram diffuser diffuses light without altering a polarization of the light; a liquid crystal layer disposed between the lower substrate and the upper substrate; a color filter layer to transmit only predetermined wavelengths of light disposed between the lower substrate and the upper substrate; and an upper linear polarizer above the upper substrate.

An advantage of the present invention is that it provides a liquid crystal display with improved viewing angles.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this application, illustrate embodiments of the inventing and together with the description serve to explain the principle of the invention.

In the drawings:

FIG. 3 shows a cross-sectional view of an LCD according to a second embodiment of the present invention;

FIG. 4 shows a cross-sectional view of an LCD according to a third embodiment of the present invention.

DETAILED DESCRIPTION OF PREFERRED EMBODIMENTS

Reference will now be made in detail to the preferred embodiments of the present invention, examples of which are illustrated in the accompanying drawings.

Figure 1:
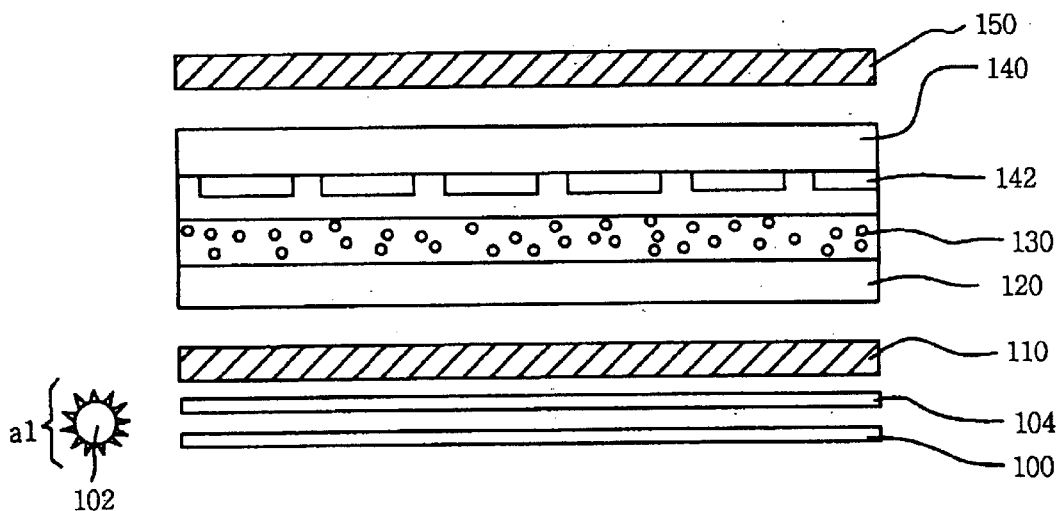
FIG. 1 shows a cross-sectional view of an LCD according to a related art.
Figure 2:
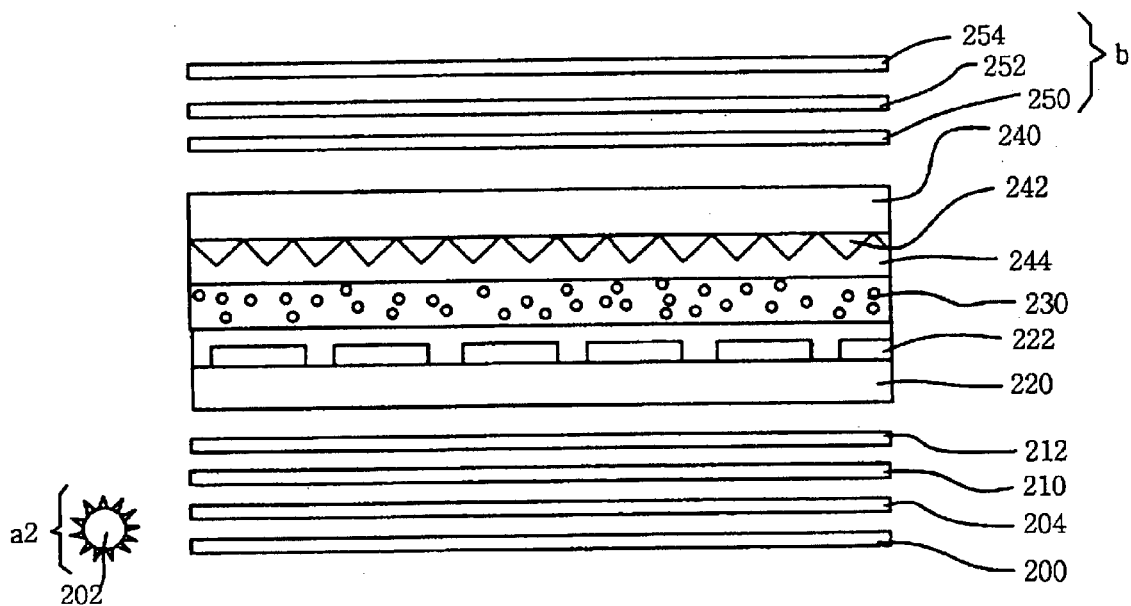
FIG. 2 shows a cross-sectional view of an LCD according to a first embodiment of the present invention.

FIG. 2 shows a cross-sectional view of an LCD according to a first embodiment of the present invention. Referring to FIG. 2, the LCD includes a back light unit a2 for producing and uniformly supplying light, and a collimating sheet 210 for collimating the light supplied from the back light unit a2. A cholesteric liquid crystal (hereinafter abbreviated CLC) polarizer 212 transmits or reflects a circular polarized light having a specific wavelength out of the light transmitted by the sheet 210. The CLC polarizer 212 selectively transmits either a left-circular polarized light or a right-circular polarized light, and reflects that which is not transmitted. A lower substrate 220, against which a CLC color filter layer 222 is formed, transmits the left-circular polarized light or the right-circular polarized light having a specific wavelength of red R, green G and blue B of the circular polarized lights having passed through the CLC polarizer 212, and reflects the rest. A liquid crystal layer 230 selectively changes a polarized direction of the left-circular polarized light or the right-circular polarized light of the circular polarized lights transmitted by the CLC color filter layer 222. An upper substrate 240, on which a hologram diffuser 242 and a planarization layer 244 covering the hologram diffuser 242 are formed, diffuses the right-circular or left-circular polarized light that was revolved as it passed through the liquid crystal layer 230. A linear polarizing transformer b transforms the left-circular or right-circular polarized light, which has been diffused through the hologram diffuser 242, into a linearly-polarized light.

The back light unit a2 is constituted by a light source 202 for producing a light, a light-guiding plate 204 for uniformly guiding the light generated from the light source 202 to a liquid crystal panel, and a reflection plate 200 for reflecting the light from the bottom or side of the light-guiding plate 204 toward the liquid crystal panel.

The linear polarizing transformer b is constituted by a λ/4 film (i.e., a quarter wave plate) 250 for transforming the left-circular or right-circular polarized light diffused through the hologram diffuser 242 into linearly-polarized light. A compensating film 252 optimizes the circular polarized light which fails to be transformed 100% into linearly-polarized light through the λ/4 film 250, and a linear polarizer 254 polarizes the light passed by the compensating film 252.

An imaging process of the first embodiment of the present invention will be explained in the following description. First, light generated by the light source 202 is supplied uniformly through the light-guiding plate 204 and is transmitted through the collimating sheet 210. Any portion of the light failing to be transmitted into the collimating sheet 210 is reflected by the reflection plate 200 and then transmitted into the collimating sheet 210.

The CLC polarizer 212 permits a specific light (i.e., left-circular or right-circular polarized light) having a corresponding wavelength out of the lights having been transmitted through the collimating sheet 210 to be selectively transmitted or reflected. Hereinafter, the first to fourth embodiments of the present invention will assume for simplicity of explanation (though another polarization could be used) that a left-circular polarized light is transmitted through the collimating sheet. In this case, recycling of the light is accomplished because the right-circular polarized light reflected by the CLC polarizer 212 is reflected by the reflection plate 200, thereby changing its polarization to left-circular polarized light.

The left-circular polarized light transmitted through the CLC polarizer 212 passes through the CLC color filter layer 222 formed on the lower substrate 220. Thus, polarized light having a specific wavelength which is one of R, G, and B is transmitted but the rest is reflected from the CLC color filter layer 222.

The left-circular polarized light having a specific wavelength of a predetermined color transmitted by the CLC color filter layer 222 passes through the liquid crystal layer 230 which changes its polarization direction. Namely, the left-circular polarized light is transformed into a right-circular polarized light by the liquid crystal layer 230.

Viewing angles are improved, because the right-circular polarized light transmitted by the liquid crystal layer 230 is diffused through the hologram diffuser 242 formed on the upper substrate 240. The hologram diffuser keeps the polarization of the polarized light intact-despite diffusing the polarized light.

In general, an LCD using the CLC color filter layer 222 without the hologram diffuser 244 results in poor color image if the LCD is seen outside of a viewing angle about 20°. Yet, the first embodiment of the present invention compensates such poor viewing angle by using the hologram diffuser 242, thereby enhancing the viewing angle for the display. And, the diffuser 242 is formed to be adjacent to the liquid crystal layer 230 in the first embodiment of the present invention, thereby enabling precisely diffused light.

The resultant right-circular polarized light having been diffused though the hologram diffuser 242 passes through the $\lambda/4$ film 250, compensation film 252, and linear polarizer 254 successively, thereby being transformed into a linearly-polarized light.

The first embodiment of the present invention enables improved image quality by installing the hologram diffuser 242 inside a liquid crystal cell to increase the viewing angle of the light which is reduced by the collimating sheet 210. The first embodiment also realizes an LCD of high brightness by recycling light reflected by the CLC polarizer and the CLC color filter layer.

FIG. 3 shows a cross-sectional view of an LCD according to a second embodiment of the present invention. Referring to FIG. 3, the second embodiment of the present invention includes a back light unit a3 producing and uniformly supplying light, and a collimating sheet 310 for collimating the light supplied from the back light unit a3. A CLC polarizer 312 transmits left-circular polarized light having a specific wavelength out of the light transmitted by the collimating sheet 310. The CLC polarizer reflects the rest of the light for recycling by reflection plate 300. A lower substrate 320, on which a CLC color filter layer 322 is formed, transmits the left-circular polarized light having a specific wavelength of R, G or B of the light transmitted by the polarizer 312 and reflects the rest. A $\lambda/4$ film 350 transforms the left-circular polarized light having passed through the CLC color filter layer 322 into linearly-polarized light. A first linear polarizer 354a is disposed under a liquid crystal layer 330 for transmitting the linearly-polarized light. An upper substrate 340 on which a hologram diffuser 342 and a planarization layer 344 covering the hologram diffuser 342 are formed, where the hologram diffuser 342 diffuses the linearly-polarized light having passed through the liquid crystal layer 330. A second linear polarizer 354b is provided on the upper substrate 340.

In the second embodiment of the present invention, light generated and supplied from the back light unit a3 is collimated by the collimating sheet 310. In the drawing, numerals 302, 300 and 304 denote a light source, a reflection plate, and a light-guiding plate, respectively.

Only circularly polarized, e.g., left-circular polarized, light of the collimated light having a specific wavelength is transmitted through the CLC polarizer 312. Also, left-circular polarized light having a specific wavelength of R, G or B passes through the CLC color filter layer 322 on the lower substrate 320, but the rest is reflected. Then, the left-circular polarized light of the specific wavelength and having a predetermined color from the CLC color filter layer 322 passes through the $\lambda/4$ film 350 and the first linear polarizer 354a, thereby being transformed into linearly-polarized light.

Accordingly, viewing angles are improved since the linearly-polarized light is diffused through the hologram diffuser 344 formed on the upper substrate 340. Additionally, the diffused linearly-polarized light is transmitted through the second linear polarizer 354b.

As shown in FIG. 3, the $\lambda/4$ film 350 and the first linear polarizer 354a are formed over the CLC color filter layer 322 inside a cell. In this case, thickness of the $\lambda/4$ film 350 and first linear polarizer 354a is about 150–200 $\mu$m, which is thicker than the liquid crystal layer 330 of 4–6 $\mu$m. Thus, the fabricating process may be difficult.

Therefore, the CLC color filter layer 322 is coated with a liquid crystal layer which may be hardened by a light (e.g., ultraviolet) to form the $\lambda/4$ film 350. The liquid crystal layer is irradiated with the ultraviolet light to realize a thin and uniform film. Also, the $\lambda/4$ film 350 is coated with direct coating polarizer (DCP) to form the first linear polarizer 354a.

Accordingly, the second embodiment of the present invention enables fabrication of a uniform and thin LCD by using the $\lambda/4$ film of a liquid crystal hardened by ultraviolet light and the first linear polarizer 354a formed of a DCP.

Moreover, the second embodiment of the present invention enables realization of a high contrast by placing the $\lambda/4$ film 350 and first linear polarizer 354a over the CLC color filter layer 322, and a higher polarization degree than in the first embodiment of the present invention by using the light transmitted through the CLC polarizer and CLC color filter layer. Also, the second embodiment of the present invention improves the image quality by installing the hologram diffuser 342 inside a liquid crystal cell to increase the viewing angle.

FIG. 4 shows a cross-sectional view of an LCD according to a third embodiment of the present invention. Referring to FIG. 4, the third embodiment of the present invention includes a back light unit a4 producing and uniformly supplying light, and a collimating sheet 410 for collimating the light supplied from the back light unit a4. A CLC polarizer 412 transmits a left-circular polarized light having a specific wavelength out of the light transmitted by the collimating sheet 410. The CLC polarizer 412 reflects the rest of the light for recycling. λ/4 film 450 transforms the left-circular polarized light into linearly-polarized light. A first linear polarizer 454a is located above the λ/4 film 450. A lower substrate 420 which transmits the linearly-polarized light is disposed on the first linear polarizer 454a. A liquid crystal layer 430 which is optically anisotropic is formed below an upper substrate 440 on which a hologram diffuser 442, a planarization layer 444 and an absorbing type color filter layer 456 are formed. The hologram diffuser 442 diffuses the linearly-polarized light transmitted by the liquid crystal layer 430, and a second linear polarizer 454b.

In the third embodiment of the present invention, light generated and supplied from the back light unit a4 is collimated by the collimating sheet 410. Then, only circularly polarized, e.g., left-circular polarized, light having a specific wavelength of the collimated lights is transmitted through the CLC polarizer 412.

Successively, the left-circular polarized light of the specific wavelength passes through the λ/4 film 450 and the first linear polarizer 454a, thereby being transformed into linearly-polarized light. In the drawing, numerals 402, 400 and 404 denote a light source, a reflection plate, and a light-guiding plate, respectively.

The linearly-polarized light passes through the liquid crystal layer 430 which changes its polarizing characteristic, and then through the absorbing type color filter layer 456. The filtered light is diffused by the hologram diffuser 442 of the upper substrate 440, and then is transmitted through the second linear polarizer 454b.

The third embodiment of the present invention introduces an absorbing type color filter layer and provides wide viewing angles by spreading out the light collimated by the collimating sheet in use of the hologram diffuser for enhancing the viewing angles.

Figure 5:
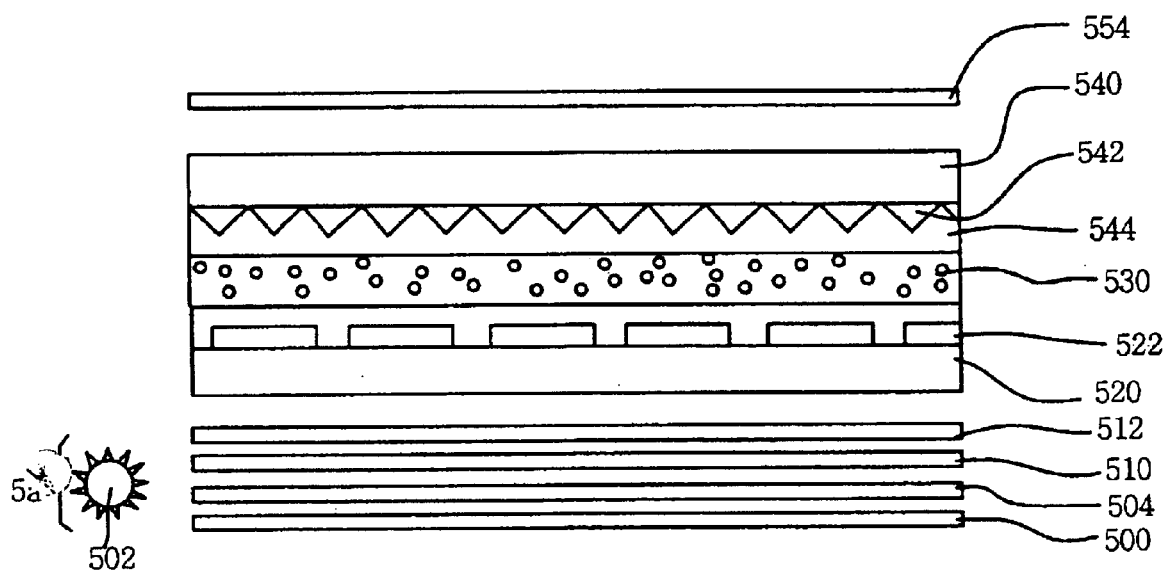
FIG. 5 shows a cross-sectional view of an LCD according to a fourth embodiment of the present invention.

FIG. 5 shows a cross-sectional view of an LCD according to a fourth embodiment of the present invention. Referring to FIG. 5, the fourth embodiment of the present invention includes a back light unit a5 for producing and uniformly supplying light, and a collimating sheet 510 for collimating the light supplied from the back light unit a5. A lower substrate 520 is disposed between a CLC polarizer 512 and a CLC color filter layer 522. The CLC polarizer 512 transmits circularly polarized light (e.g., left-circular polarized light) having a specific wavelength among the light transmitted by the collimating sheet 510. The polarizer 512 reflects the rest of the incident light for recycling the light. The CLC color filter 522 transmits the left-circular polarized light having a specific wavelength of red R, green G and blue B of the light transmitted by the polarizer 512 and reflects the rest. The liquid crystal layer 530 changes a polarized state of the transmitted light from CLC color filter layer 522. A hologram diffuser 542 and a planarization layer 544 covering the hologram diffuser 542 are formed on an upper substrate 540. The hologram diffuser 542 diffuses the right-circular or left-circular polarized light having been revolved by the liquid crystal layer 530, and a linear polarizing transformer 554 transforms the left-circular or right-circular polarized light which has been diffused through the hologram diffuser 542 into a linearly-polarized light.

In the fourth embodiment of the present invention, a travelling direction of the light generated and supplied from the back light unit a5 is controlled to be parallel by the collimating sheet 510. In the drawing, numerals 502,500 and 504 denote a light source, a reflection plate, and a light-guiding plate, respectively. Then, only circular polarized light (e.g., left-circular polarized) having a specific wavelength is transmitted by the CLC polarizer 512 but the rest is reflected therefrom.

Also, the transmitted left-circular polarized light, which has passed through the CLC polarizer 512 and which has a specific wavelength of R, G or B, passes through the CLC color filter layer 522, but the rest is reflected. Then, the diffused left-circular polarized light passes through the linear polarizing transformer 554, and is thereby transformed into a linearly-polarized light.

The CLC color filter layer 522 upon which a circular polarized light is to be incident is used in the fourth embodiment of the present invention. In general, a CLC color filter is fabricated by mixing CLC, nematic liquid crystal, photoinitiator and the like.

When the CLC color filter layer 522 is fabricated in the fourth embodiment of the present invention, a photoinitiator which reacts differently in accordance with the polarized states of a light, such as a mixture of dichromic photoinitiator, and UV absorber may be used. Dichromic acid photo initiator initiates this variable reaction and provides various results in accordance with different polarizing characteristics of the light.

Generally, double refraction barely exists in a CLC polarizer in the direction vertical to a spiral axis. When a CLC layer is fabricated by mixing dichromic photoinitiator, deformation of a helix is generated in a pitch of the CLC layer when a linearly polarized UV light is applied. Namely, double refraction exists in the direction vertical to the spiral axis.

Thus, the CLC color filter layer 522 enables the selective transmission of a specific wavelength of a circular polarized light, and satisfies the 'λ/4' relation by controlling the thickness of a layer with the above double refraction and by choosing a liquid crystal fit for the condition of dispersion of a refraction rate. Accordingly, the present invention enhances viewing angles by installing a hologram diffuser inside a cell of an LCD, provides a clean image, and is applicable to various modes free from polarized states.

Moreover, the present invention realizes an LCD of high brightness by inserting a CLC polarizer and a CLC color filter layer therein.

It will be apparent to those skilled in the art that various modifications and variations can be made in a liquid crystal display of the present invention without departing from the spirit or scope of the inventions. Thus, it is intended that the present invention cover the modifications and variations of this invention provided they come within the scope of the appended claims and equivalents.

What is claimed is:

1. A liquid crystal display usable with a back light source supplying light, comprising:
   a cholesteric liquid crystal (CLC) polarizer to transmit one of left-circularly polarized light and right-circularly polarized light from the back light source, and to reflect other light not transmitted;
   a lower substrate on which a CLC color filter layer is formed wherein the CLC color filter layer transmits the circularly polarized light from the CLC polarizer having certain wavelengths and reflects other light not transmitted;

a liquid crystal layer to selectively revolve a polarized direction of the circularly polarized light from the CLC color filter layer;

an upper substrate over the liquid crystal layer and having a hologram diffuser wherein the hologram diffuser diffuses the revolved circularly polarized light from the liquid crystal layer; and a linear polarizing transformer to transform the diffused circularly polarized light from the hologram diffuser into linearly polarized light, wherein the hologram diffuser is positioned below the upper substrate.

2. The liquid crystal display according to claim 1, wherein the linear polarizing transformer includes a $\lambda/4$ film to transform the circularly polarized light into linearly-polarized light, a compensating film over the $\lambda/4$ film, and a linear polarizer over the compensating film.

3. The liquid crystal display according to claim 1, further comprising:

a planarization layer disposed on the hologram diffuser to planarize the hologram diffuser.

4. The liquid crystal display according to claim 1, further comprising:

a collimating member disposed below the lower substrate to collimate the light supplied by the back light source and direct it toward the CLC polarizer.

* * * * *